United States Patent [19]

Netzer

[11] Patent Number: 5,313,063

[45] Date of Patent: May 17, 1994

[54] FOLDABLE OPTICAL APPARATUS

[75] Inventor: Yishay Netzer, Yuvalim, Israel

[73] Assignee: State of Israel Ministry of Defense Armament Development Authority Rafael, Haifa, Israel

[21] Appl. No.: 960,111

[22] Filed: Oct. 9, 1992

[30] Foreign Application Priority Data

Oct. 9, 1991 [IE] Ireland ................. 99690

[51] Int. Cl.$^5$ ............ G02B 26/08; G02B 27/04; G02B 23/20

[52] U.S. Cl. ................. 250/334; 250/332; 250/347

[58] Field of Search ........... 250/330, 332, 334, 341, 250/342, 347, 353, 370.08, 338.1; 356/4, 5

[56] References Cited

U.S. PATENT DOCUMENTS

| 4,386,848 | 6/1983 | Clendenin et al. ......... 356/5 |
| 4,445,140 | 4/1984 | Netzer. | |
| 4,713,544 | 12/1987 | Grage ................. 250/334 |
| 4,810,088 | 3/1989 | Karning et al. ......... 250/347 X |
| 4,902,128 | 2/1990 | Seibecker et al. ....... 250/347 X |
| 5,047,638 | 9/1991 | Cameron et al. ........ 250/341 X |

FOREIGN PATENT DOCUMENTS

| 0402601 | 12/1990 | European Pat. Off. . | |
| 0463929 | 1/1992 | European Pat. Off. . | |
| 3325483 | 1/1985 | Fed. Rep. of Germany ...... 250/334 |

Primary Examiner—Constantine Hannaher
Assistant Examiner—Edward J. Glick
Attorney, Agent, or Firm—Helfgott & Karas

[57] ABSTRACT

Forward looking infra-red apparatus including an enclosure, a reflector receiving infra-red energy from a field of view and a receiver, which receives the infra-red energy from the reflector and provides an output indication of an infra-red image of the field of view, wherein the receiver is hermetically sealed within the enclosure and the reflector is disposed outside of the enclosure and is foldably mounted with respect thereto so as to assume a first orientation when the apparatus is in operation and a second folded and more compact orientation than the first orientation when the apparatus is not in use.

6 Claims, 4 Drawing Sheets

FOLDABLE OPTICAL APPARATUS

FIELD OF THE INVENTION

The present invention relates to night vision apparatus generally and more particularly to infra-red sensing apparatus.

BACKGROUND OF THE INVENTION

There exist a wide variety of infra-red sensing apparatus. Forward looking infra-red (FLIR) apparatus has been developed and is in extensive use in aircraft as well as ground vehicles. Due to its high cost, size, weight and complexity, it is not suitable for being carried by an infantry soldier.

U.S. Pat. No. 4,445,140 of the present inventor describes an electronic image stabilization system useful in an infra-red sensing device. The discussion of and references to the state of the art found therein are considered to be relevant to the present invention.

SUMMARY OF THE INVENTION

The present invention seeks to provide an improved FLIR which is suitable for being carried and used by individual soldiers in either a hand-held mode or in a tripod-mounted mode.

There is thus provided in accordance with a preferred embodiment of the present invention a forward looking infra-red apparatus including reflector apparatus for receiving infra-red energy from a field of view and apparatus for receiving the infra-red energy from the reflector and for providing an output indication of an infra-red image of the field of view, and wherein the apparatus for receiving the infra-red energy is hermetically sealed within an enclosure and the reflector is disposed outside of the enclosure and is foldably mounted with respect thereto so as to assume a first orientation when the apparatus is in operation and a second folded and more compact orientation than the first orientation when the apparatus is not in use.

In accordance with a preferred embodiment of the invention the apparatus for receiving comprises infra-red detector apparatus and optical apparatus for directing the infra-red energy received from the reflector to the detector.

Preferably, the optical apparatus includes at least one scanning mirror. Alternatively, the optical apparatus may employ a staring array of detectors and may not include a scanning mirror.

Preferably, the optical apparatus includes apparatus for selecting the size of the field of view.

Additionally, there is preferably also provided laser rangefinding apparatus receiving laser energy via the reflector.

The FLIR apparatus preferably also includes a compass.

Additionally in accordance with a preferred embodiment of the present invention, there is provided forward looking infra-red apparatus including reflector apparatus for receiving infra-red energy from a field of view, apparatus for receiving the infra-red energy from the reflector and for providing an output indication of an infra-red image of the field of view, laser range-finding apparatus receiving laser energy via the reflector and a compass.

The foregoing apparatus preferably also includes line of sight stabilization means. The apparatus of the present invention is characterized in that it provides a relatively very large aperture, which is substantially unobscured, with a relatively small overall volume and weight.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
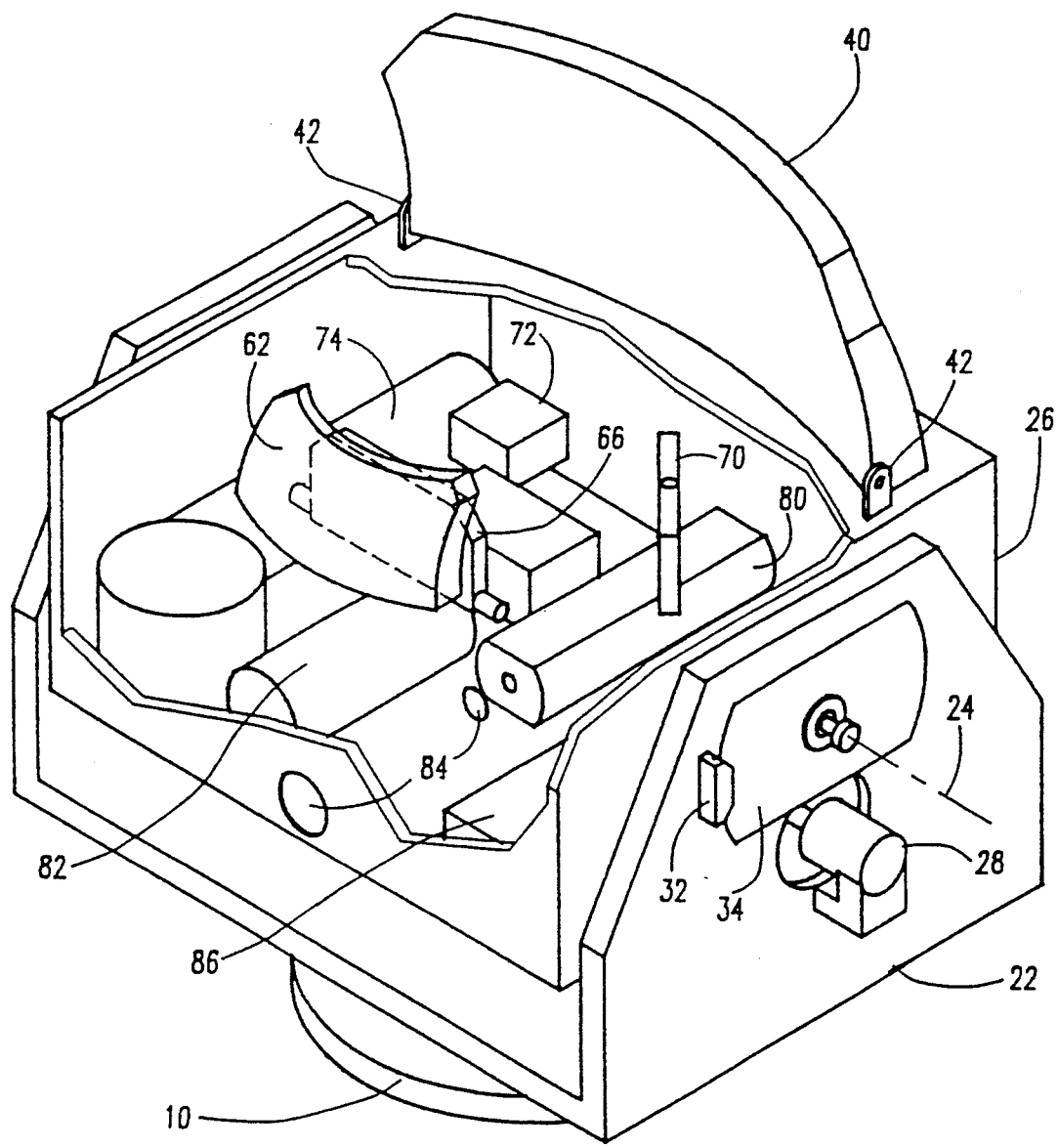
FIG. 1 is a simplified pictorial illustration of FLIR apparatus constructed and operative in accordance with a preferred embodiment of the present invention.

Reference is now made to FIGS. 1-5, which illustrate a FLIR constructed and operative in accordance with a preferred embodiment of the present invention and including a mounting base 10, which can be mounted on any suitable support and onto which is bearing mounted a mounting shaft 12, fixedly associated with an azimuth encoder disc 14 and with a housing driving gear 16.

Azimuth encoder disc 14 is operatively associated with an azimuth encoder 18, such as a conventional optical rotational encoder. An azimuth position selector motor 20 is mounted onto mounting base 10 and operatively engages driving gear 16 for selectably rotating gear 16 relative to base 10.

Supported by and fixed to shaft 12 for rotation therewith and with gear 16 is a housing support member 22, of overall U-shaped configuration. Rotationally bearing mounted onto housing support member 22 by means of mounting axles 24 is a hermetically sealed housing 26.

The elevational orientation of housing 26 relative to housing support member 22 is determined by the operation of an elevation position selector motor 28, which is mounted on member 22 and engages a housing driving gear 30, fixed to an axle 24 for rotation together therewith and with housing 26. An elevation encoder 32 cooperates with an elevation encoder disc 34, fixed to axle 24 for rotation together therewith and with housing 26, to provide an output indication of the elevation orientation of the housing 26.

A mirror 40 is pivotably mounted onto the top of housing 26 by means of mounting elements 42. As seen particularly in FIGS. 2 and 3, mirror 40 may be oriented in an operative orientation (FIG. 2) for receipt of IR band and laser radiation from a field of view and in a folded-down orientation (FIG. 3) for storage and transport. Mirror 40 is preferably designed to receive radiation from a relatively narrow field of view, such as 2 degrees.

Figure 2:
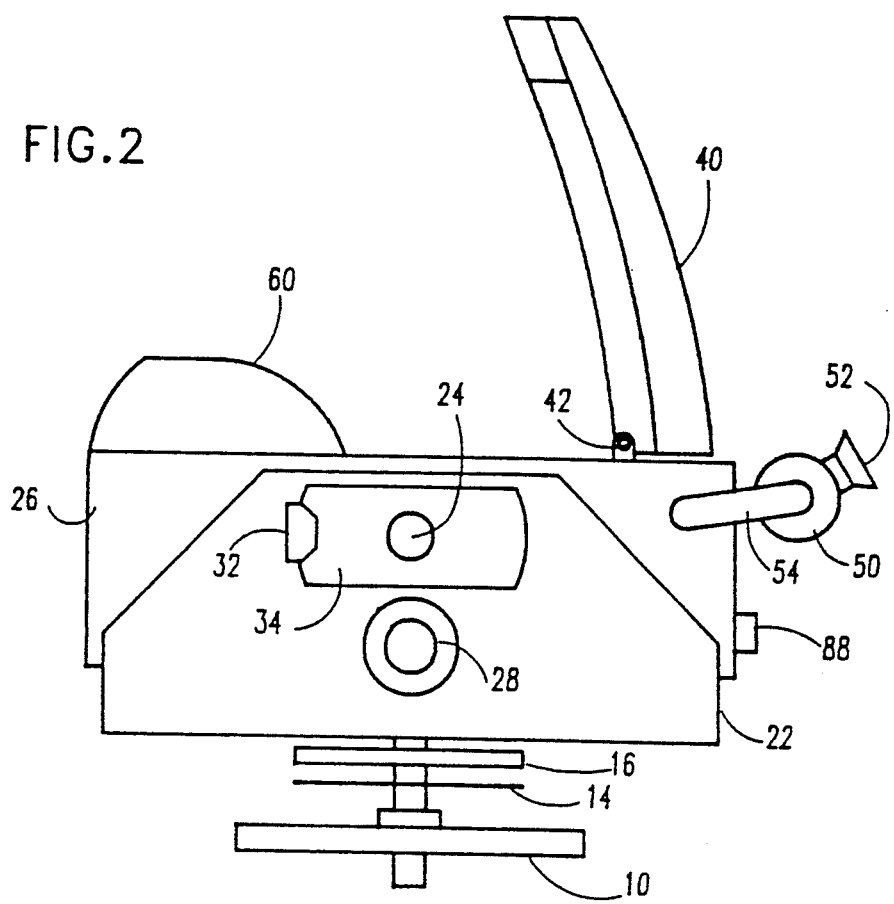
FIGS. 2 and 3 are side view illustrations of the FLIR apparatus of FIG. 1 in respective operational and storage orientations.
Figure 3:
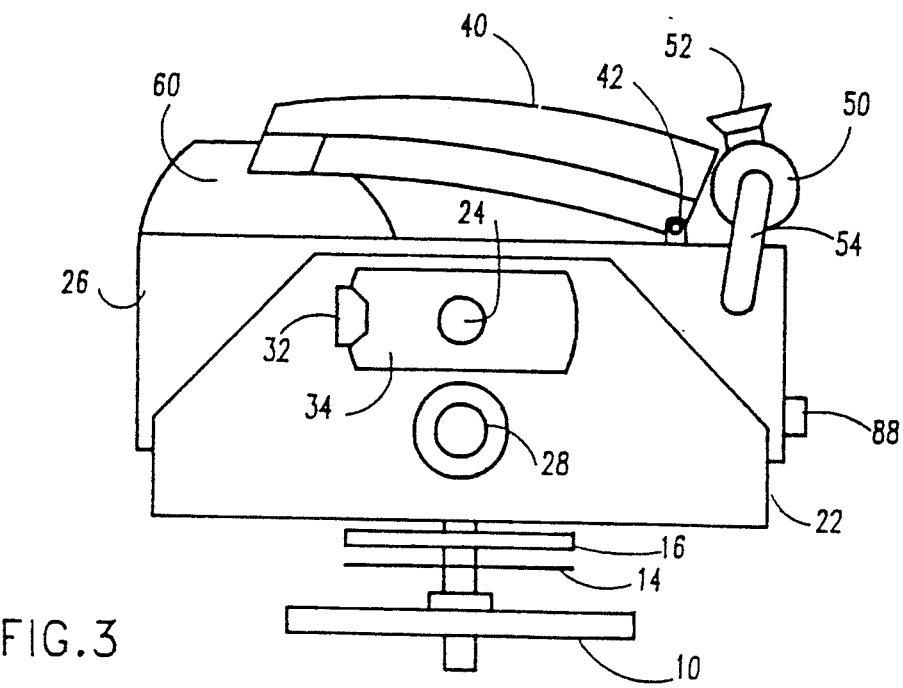

A cathode ray tube (CRT) display 50 and associated eyepiece 52 are also pivotably mounted onto housing 26 by means of a pivotable mounting element 54. The orientations of the CRT 50 and eyepiece 52 in respective operative and storage orientations are shown in FIGS. 2 and 3 respectively.

Housing 26 is formed with a raised back portion 60, having a forward-facing wide field-of-view objective lens 62 formed at the front thereof and a radiation entrance window 64 formed at the rear thereof.

Disposed partially within raised back portion 60 is a pivotably mounted dichroic field of view selection mirror 66. Mirror 66 is in its upstanding operational orientation when mirror 40 is in use and it is desired to receive radiation only from a narrow field of view. In its upstanding orientation, mirror 66 is arranged to reflect IR band radiation received via mirror 40 to a collimator lens assembly 68 and thence via a scanning mirror 70, such as a nodding mirror, and detector optics 72 to an IR detector assembly 74 including detectors, a cryocooler and dewar. Elements 68, 70, 72 and 74 may be entirely conventional lenses or alternatively diffractive optics.

Mirror 66 is arranged to transmit certain laser radiation such as at a wavelength of 1.06 micron, which is received via mirror 40 and entrance window 64. This laser radiation thus impinges directly on a laser detector 76, such as a silicon avalanche photodetector, which provides an output to range counter electronics.

Figure 4:
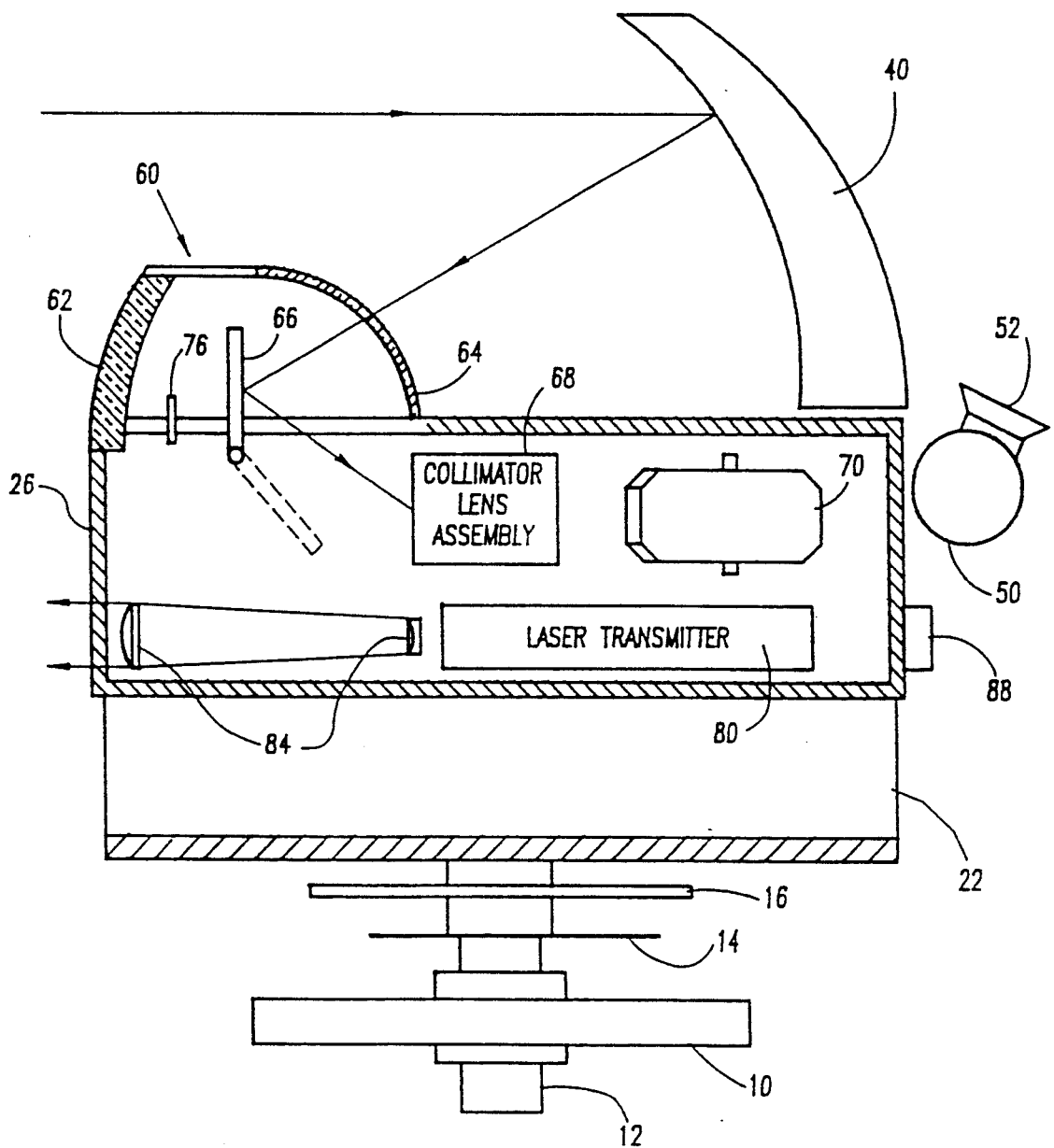
FIGS. 4 and 5 are partially schematic, partially block diagram, respective side and front sectional view illustrations of the FLIR of FIGS. 1-3.
Figure 5:
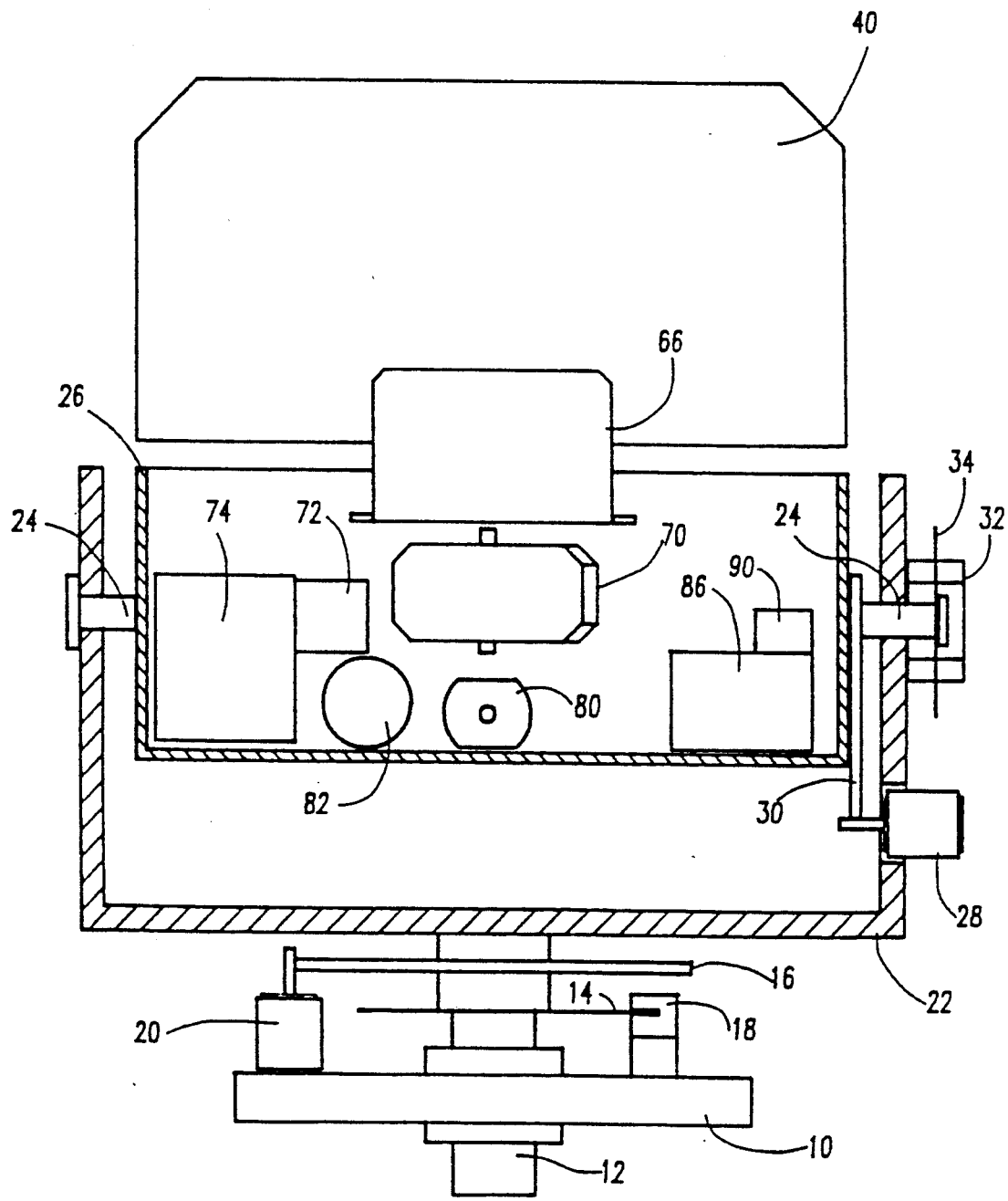

When mirror 66 is in its upstanding orientation it blocks radiation received via lens 62 from reaching collimator lens assembly 68. When, however, mirror 66 is in a lowered orientation, as shown in FIG. 4, any radiation received from mirror 40 is not directed to collimator lens assembly 68 and instead radiation received via lens 62 from a relatively wide field of view is directed via collimator lens assembly 68 and optical apparatus 70 and 72 to detector assembly 74.

Also disposed within housing 26 is a laser transmitter 80 which, in cooperation with laser energy capacitor 82 and beam expanding and collimating optics 84, provides a laser rangefinding output beam which may be directed onto a potential target.

Image processing, laser rangefinding and display electronics 86 may also be located within housing 26 and may receive inputs from detector assembly 74 and laser detector 76, which receives detects laser light emitted by the rangefinder and reflected from the target, and provide suitable outputs to CRT 50, as well as to an output port 88, for supply to external utilization circuitry.

It is a particular feature of the present invention that housing 26, containing the FLIR optics and the laser rangefinder optics (with the exception of mirror 40) is hermetically sealed against contaminants and thus enables the FLIR to be employed under relatively harsh battlefield conditions.

A compass and angular rate sensors are preferably provided within housing 26 and may be placed together with optical apparatus 72 or at any other suitable location. Their purpose is to provide absolute direction for the range finding equipment and may also be coupled to electronics 86. Alternatively, the compass and angular orientation sensors may be mounted outside housing 26. Generally speaking, line of sight stabilization apparatus 90 of the type described in U.S. Pat. No. 4,445,140, the disclosure of which is hereby incorporated by reference or other suitable line of sight stabilization apparatus, may be incorporated in the device described herein.

It will be appreciated by persons skilled in the art that the present invention is not limited by what has been particularly shown and described hereinabove. Rather the scope of the present invention is defined only by the claims which follow:

I claim:

1. Forward looking infra-red apparatus comprising:
    an enclosure; a reflector receiving infra-red energy from a field of view; and
    a receiver, which receives the infra-red energy from the reflector and provides an output indication of an infra-red image of the field of view,
    wherein the receiver is hermetically sealed within the enclosure; and
    the reflector is disposed outside of the enclosure and is foldably mounted with respect thereto so as to assume a first orientation when the apparatus is in operation and a second folded and more compact orientation than the first orientation when the apparatus is not in use.

2. Apparatus according to claim 1 and wherein the receiver comprises an infra-red detector and directing optics adapted to direct the infra-red energy received from the reflector to the detector.

3. Apparatus according to claim 2 and wherein the directing optics includes at least one scanning mirror.

4. Apparatus according to claim 2 and wherein said directing optics includes means for selecting the size of the field of view.

5. Apparatus according to claim 1 and also comprising a laser rangefinding detector receiving laser energy via the reflector.

6. Apparatus according to claim 1 and also comprising line of sight stabilization means.

* * * * *